United States Patent
Klumps et al.

[19]

[11] Patent Number: 5,960,144

[45] Date of Patent: Sep. 28, 1999

[54] COMMUNICATION CABLE WITH STRAIN RELIEF ELEMENTS APPLIED IN THE REGION OF THE OUTSIDE CLADDING

[75] Inventors: Karl-Heinz Klumps, Saterland; Franz-Josef Wichmann, Friesoythe, both of Germany

[73] Assignee: Siemens Aktiengesellschaft, Munich, Germany

[21] Appl. No.: 08/947,705

[22] Filed: Oct. 9, 1997

[30] Foreign Application Priority Data

Oct. 9, 1996 [DE] Germany ................... 196 41 616

[51] Int. Cl.$^6$ ........................................ G02B 6/44
[52] U.S. Cl. .................. 385/113; 385/101; 385/109; 385/111
[58] Field of Search ................... 385/109–113, 100, 385/101

[56] References Cited

U.S. PATENT DOCUMENTS

| | | | |
|---|---|---|---|
| 4,787,705 | 11/1988 | Shimoto et a. | 385/101 |
| 5,448,669 | 9/1995 | Dunn et al. | 385/101 |
| 5,469,523 | 11/1995 | Blew et al. | 385/101 |
| 5,509,097 | 4/1996 | Tondi-Resta et al. | 385/113 |
| 5,677,974 | 10/1997 | Elms et al. | 385/101 |

FOREIGN PATENT DOCUMENTS

WO 95/13556  5/1995  WIPO ........................ 385/109

*Primary Examiner*—John D. Lee
*Assistant Examiner*—Victoria D. Hao
*Attorney, Agent, or Firm*—Hill & Simpson

[57] ABSTRACT

A communication cable, which has a cable core provided in the center as well as outside cladding and strain relief elements applied in the region of the outside cladding, has at least one optical transmission element which includes at least one light waveguide, provided in the region of the strain relief elements.

20 Claims, 2 Drawing Sheets

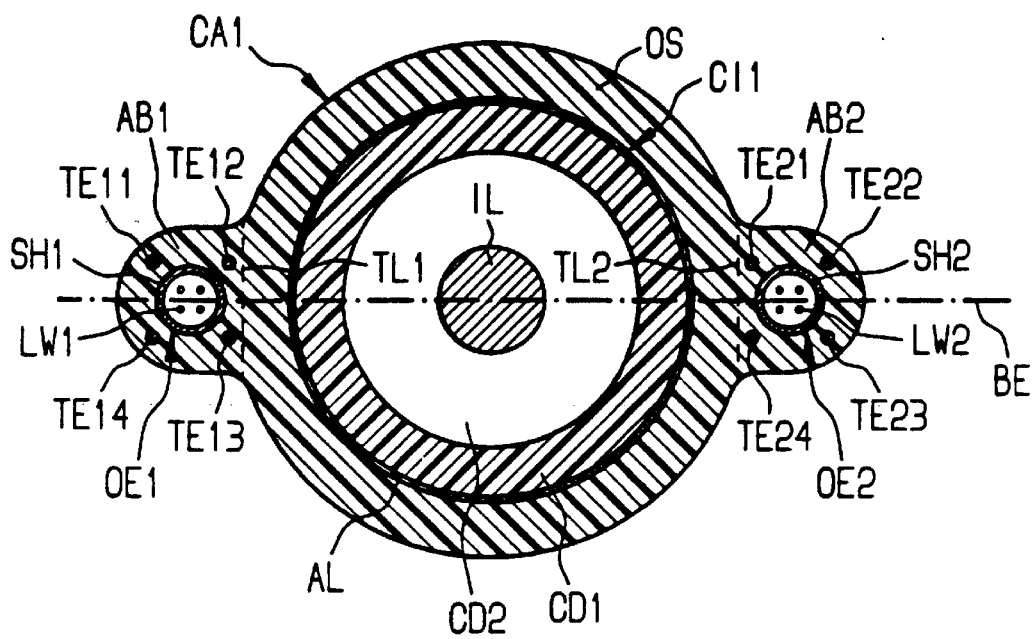
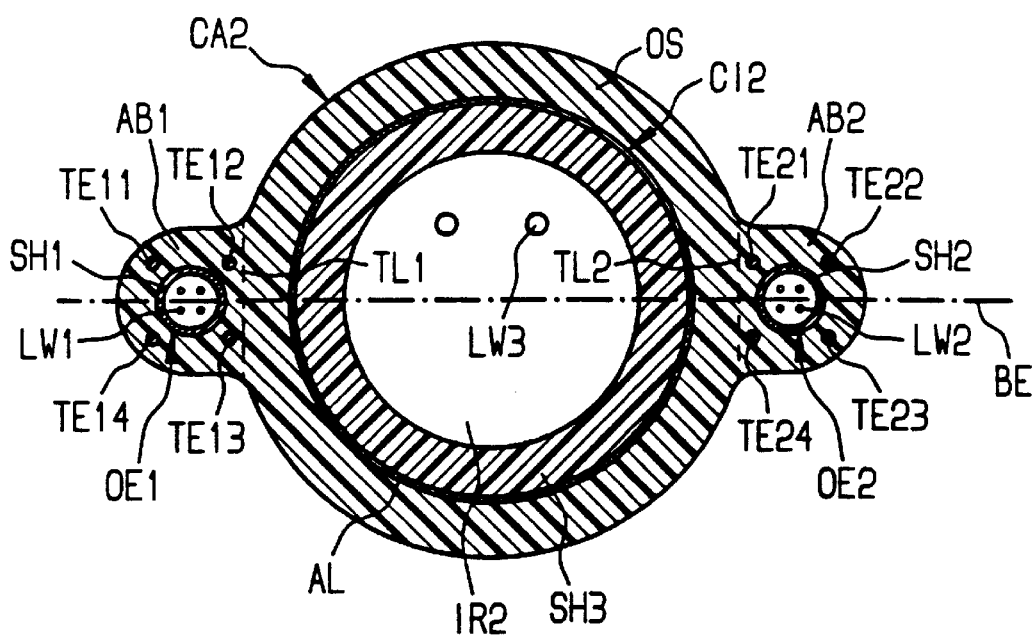

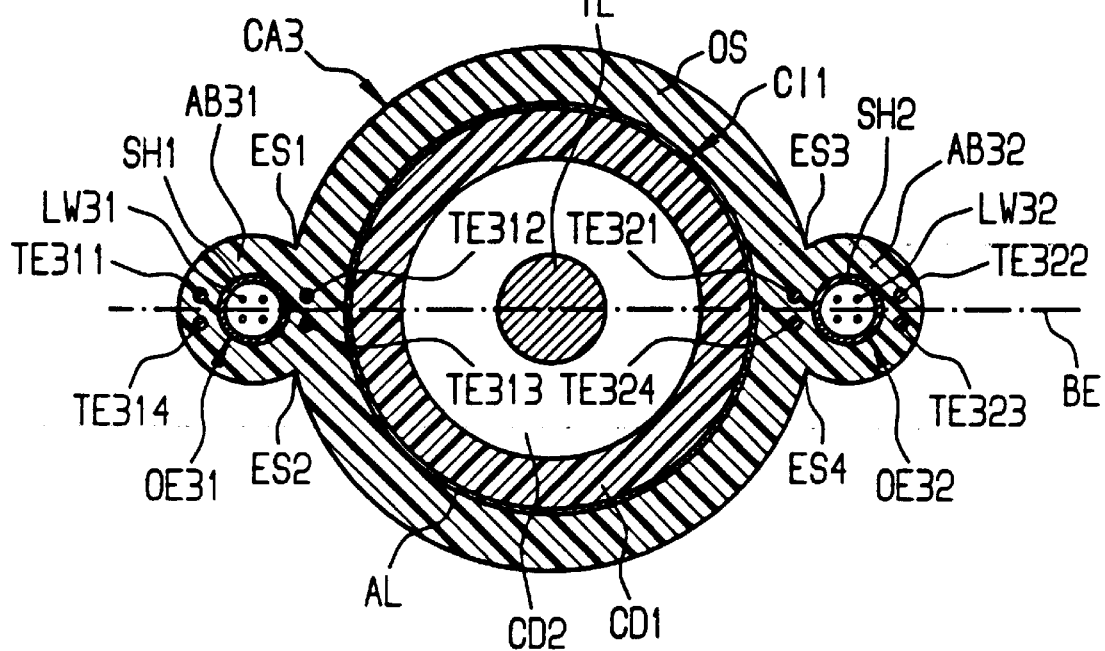
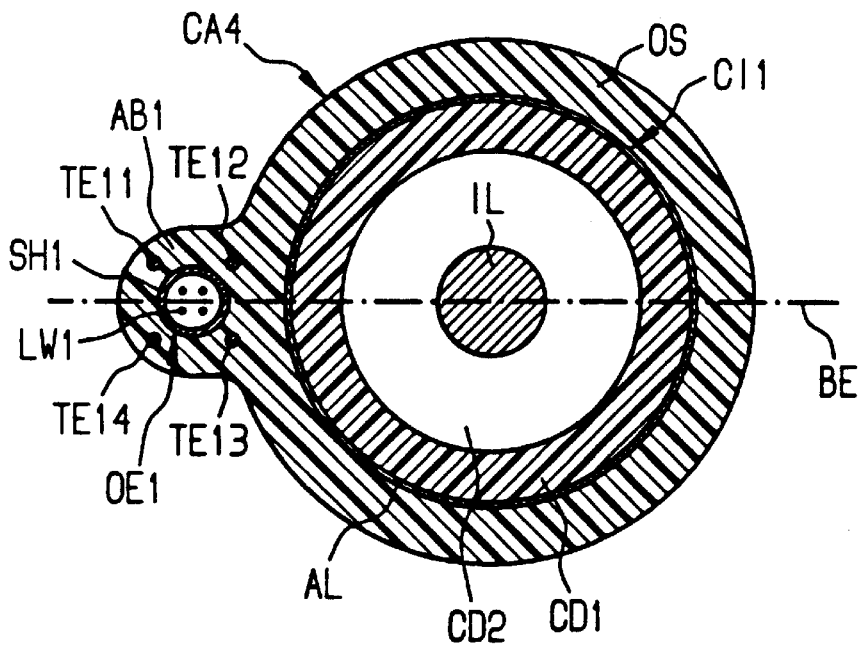

COMMUNICATION CABLE WITH STRAIN RELIEF ELEMENTS APPLIED IN THE REGION OF THE OUTSIDE CLADDING

BACKGROUND OF THE INVENTION

The present invention is directed to a communication cable with a cable core provided in the center surrounded by an outside cladding as well as strain relief elements applied in the region of the outside cladding.

Allowed U.S. patent application Ser. No. 08/646,322 which issued as U.S. Pat. No. 5,706,381, whose disclosure is incorporated by reference and which is a national phase application based on WO-A1 95/13556, discloses a cable having strain relief elements adjacent the outside surface of the cable. The tensile elements are arranged in the cladding region and lie in a symmetrical plane that simultaneously forms the bending plane for the cable. The tensile elements lie diametrically opposite one another and thus are offset by 1800 from one another. The light waveguides are arranged in the center of the cable in a single layer or in a multi-layer envelope.

In many instances, it is desirable to construct cables in a type of hybrid structure, for example to arrange a plurality of transmission elements that are at least partially independent of one another in the cable. For example, this is the case where both electrical as well as optical transmission elements are employed. However, applications with two or more optical transmission elements are also conceivable in this context.

SUMMARY OF THE INVENTION

The present invention is based on the object of creating a cable wherein the hybrid structure is obtained in such a way that it is especially simple and easy to manipulate. In a communication cable, which has a cable core provided in the center and an outside cladding as well as strain relief or tensile elements applied in the region outside cladding, this object is obtained by at least one optical transmission element with at least one light waveguide being additionally provided in a region of the strain relief or tensile elements.

In the invention, the separation of the cable core provided in the center on the one hand, and an additional provided optical transmission element or elements, on the other hand, is assured and that the latter are arranged in the region of the strain relief elements. On the other hand, this offers especially simple mechanical protection because of the strain relief elements are likewise always effective in this location.

Other advantages and features of the invention will be readily apparent from the following description of the preferred embodiments, the drawings and claims.

BRIEF DESCRIPTION OF THE DRAWINGS

FIG. 1 is a transverse cross-sectional view of a structure of a first exemplary embodiment of a mixed electrical and optical cable according to the present invention;

FIG. 2 is a transverse cross-sectional view of a second embodiment according to the present invention;

FIG. 3 is a transverse cross-sectional view of a modification of the first exemplary embodiment of FIG. 1; and FIG. 4 is a transverse cross-sectional view of a second modification of the structure of FIG. 1.

DESCRIPTION OF THE PREFERRED EMBODIMENTS

The principles of the present invention are particularly useful when incorporated in a cable CA1 that is composed of an electrical cable as well as optical transmission elements. In the present example, the cable CA1 has a electrical cable Cl1 which is fashioned as a coaxial cable and comprises an inside conductor IL which is surrounded by a tubular dielectric CD1 which forms a space CD2 which is periodically interrupted by radially supporting webs and is filled with a dielectric such as air. An outside conductor AL is provided on the outside of the tubular dielectric CD1 and this conductor AL may be fashioned in the form of a foil, a weave or a spun structure, or the like of conducting material so that a multi-layer arrangements are also possible. The inner conductor IL together with the two dielectric CD1 and CD2 and the outer conductor AL form a cable core Cl1 of which a potential multi-layer outside cladding OS is applied on the outside as protection, and preferably is in the form of an extruded plastic material. The cable core can also exhibit a structure differing from that shown. For example, the core can also be composed of stranded bundles or a plurality of insulated electrical wires or optical transmission elements in the form of a light waveguide. An exemplary embodiment of light waveguides in the region of the cable core is shown in FIG. 2 by cable core C12.

The cables according to FIGS. 1 and 2 often require tensile or strain relief elements for providing their tensile strength and/or supporting properties, whereas four such tensile or strain relief elements TE11–TE–are provided on the left side and another four strain relief elements TE21–TE24 are provided on the right hand side in the region of the outside cladding. To that end, the outside cladding expediently has two longitudinally extending projections or ridges AB1 and AB2 into which the strain relief elements are embedded. In the present example, the strain relief elements are not uniformly distributed over the circumference of the outside cladding OS but lies symmetrically relative to a bending plane BE that is illustrated for the cable CA1 and is assumed when bending this cable. The grounds for this are that the strain relief elements TE11–TE–and TE21–TE24 experiences lowest mechanical stresses in this bending plane.

At least one optical transmission element OE1, OE2 is additionally provided in the region of the longitudinal ribs AB1 and AB2 of the outside cladding OS. In the present example each of the optical element OE1 and OE2 contain a respective protective sheath SH1 or SH2 which receive at least one light waveguide LW1 or LW2 which are potentially embedded in a filling compound. In this way, a mixed electrical and optical cable CA1, which is a hybrid cable, occurs wherein the light waveguides LW1 and LW2 due to their arrangement in the region of the strain relief elements TE1–TE14 or TE21–TE24 likewise experience a far-reaching mechanical protection given bending stresses because the stress relief elements TE11–TE14 and TE21–TE24 see to it that the optical transmission elements OE1 and OE2 are respectively stressed as little as possible and assume an optimum position in the bending region.

In the present example, the tensile elements TE11–TE14 and TE21–TE24 are respectively arranged symmetrically relative to the corresponding optical transmission element OE1 or OE2 and to their longitudinal axes. They also can lie symmetrically relative to the bending plane BE1 which proceeds through the longitudinal axis of the cable CA1 and thus provides a mechanical optimum structure. It is expedient for the protective sheath SH1 and SH2 to be composed of a hard material or at least a material that is harder than the material employed for the outside cladding OS. In particular, for example, small metal tubes or hard plastic material such as for example a high density polyethylene (HDPE) or the like comes into consideration for the protective sheaths SH1 and SH2. As a result, the protective interior which contains a light waveguide LW1 and LW2 is especially effectively mechanically protected toward the outside. The projections or ribs AB1 and AB2 that are provided are advantageously constructed outwardly salient to such an extent that for example for splicing or branching purposes they can be parted or separated from the actual outside cladding in a simple way namely so that the outside cladding OS will remain optimally closed. Possible parting lines are shown with broken lines and are referenced TL1 and TL2. For example, such a cable of FIG. 1 can be employed for a house connection wherein an electrical part including the still closed outside cladding OS is conducted to a different terminal device than the optical transmission elements OE1 and OE2 which are in the projections or side ribs AB1 and AB2. The separation of the optical transmission elements OE1 and OE2 advantageously occurs in a region wherein the carrying function of the tensile elements TE11–14 and TE21–24 are no longer required particularly for example in the region of the house connection, a branching upon transition from the overhead cable to a bearing cable or the like.

The structure of FIG. 1 can be modified so that a purely optical transmission cable CA2 of FIG. 2 is provided. Here, the inside cable C12 or, respectively, the cable core is composed of a protective sheath SH3 preferably of a plastic material in whose inside IR2 at least one light waveguide LW3 is provided and preferably is embedded in a filling compound. The structure in the region of the two outer optical transmission elements OE1 and OE2 is unmodified compared to that of FIG. 1. The outer conductor AL can be retained as a mechanical protection or omitted as well. The light waveguides LW1–LW3 are advantageously accommodated in the inside of the respective protective sheaths SH1–SH3 with excess length in order to assure an optimally good mechanical protection for these waveguides.

In FIG. 3, a modification generally indicated CA3 of the embodiment of FIG. 1 is provided and is mainly a change in the construction of the projections such as AB31 and AB32. In order to facilitate the parting of the particular optical transmission elements OE31 or OE32 approximately tangentially proceeding incisions ES1–ES4 are provided in the region of the transition from the outside cladding OS to the projections AB31 and AB32. As a result of these incisions, the parting can be implemented in an extremely simple manner for example with a knife. In this arrangement, tensile elements TE311–TE314 are provided on the left optical element OE31 and corresponding tensile elements TE321–TE324 are provided on the right side with the optical transmission element OE32. These elements TE--TE314 and TE321–TE324 are no longer symmetrically arranged around the protective sheaths SH1 and SH2 for the light waveguides LW1 and LW2 but are positioned optimally close to the bending plane BE. This has the advantage that the bending resistance of the cable CA3 can be reduced so that mechanical stresses onto the protective sheaths SH1 and SH2 can also be reduced by the strain relief elements TE311–TE314 and TE321–TE324. In the present example, however, the strain relief elements continue to lie symmetrically relative to the bending plane BE namely in pairs. Instead of the illustrated pair of tensile elements for example of the pair TE311 and TE314, however, it is also possible to employ only a single tensile element which is expediently arranged exactly in the bending plane BE.

In an exemplary embodiment of FIG. 4, a modification has been undertaken on the outside compared to FIG. 1 insofar as only one projection AB1 is provided so that the illustrated cable can be preferably employed as an overhead cable whereby the projection AB1 represents the carrying elements similar to that what is referred to as a FIG. 4F cable. For example, such a cable can be conducted to a house connection where the branching into the electrical and the optical connections is undertaken and the parting of the projection AB1 is thereby also implemented. By contrast to the proceeding embodiments, the optical transmission element OE1 in this embodiment is no longer arranged lying diametrically opposite but all on one side.

It is generally advantageous to respectively allocate an even number of strain elements to the respective optical transmission element whereby these are always arranged in the symmetrical configuration with reference to their longitudinal axis and also advantageously lie symmetrically relative to respective bending plane BE.

In the above exemplary embodiments, the optical transmission elements and the strain relief elements are expediently arranged to proceed respectively parallel to the axis and on a straight line with reference to the cable axis, for example, a helical wrapping of the optical transmission element with respect to the cable axis is not required.

Metallic conductors that can also be potentially co-employed for the power supply can be utilized as a strain relief element. However, it is also possible to employ non-conductive materials particularly in the form of skeins, strings, for example, glass fibers, Aramid yarn or the like.

The arrangement can also be modified so that the type of empty tube is provided in the inside, for example, a structure corresponding to FIG. 2 is selected whereby no electrical and/or optical transmission elements are provided within the protective sheath SH3 or, respectively, the outside cladding OS. Other cables or transmission elements can then also be subsequently pulled into this empty tube as needed, for example, when reinstallation is necessary. Advantageously, the strain relief elements can be profiled and/or be provided with an adhesion promoter in order to thus improve their embedding into the material of the outside cladding.

The strain relief elements or at least one of them can be respectively fashioned so that it serves as a rip string for parting the optical transmission elements and/or respective projection, for example, AB1 and AB2 from the cable.

The respective optical transmission elements for example OE1 and OE2 can also additionally comprise means for improving the tensile strength. For example, they may have a spun element or a woven element provided on their protective sheaths SH1–SH3. A potentially parted optical transmission element, for example OE1 or OE2 can be advantageously re-employed and laid after the parting as an independent optical cable.

The dimensioning of the inventive cable is advantageously undertaken so that the cable core Cl1 or C12 will exhibit a larger diameter than the outside dimensions of the respective projections AB1 or AB2. Advantageously, the cable core Cl1 is selected about two or five times greater than the outside dimensions of the projections for example AB1 and AB2. The diameter in the range of 0.5 and 4 mm are expedient for the dimensions of the protective sheaths SH1 and SH2 of the optical transmission elements dependent on the plurality of light waveguides to be respectively introduced. The tensile elements TE111–TE124 and TE121–TE124 also expediently exhibit diameters arranged between 0.1 and 2 mm and are preferably in a range from 0.2 to 1.0 mm.

Although various minor modifications might be suggested by those skilled in the art, it should be understood that we wish to embody within the scope of the patent warranted hereon all such modifications as reasonably and properly come with the scope of our contribution to the art.

We claim as our invention:

1. In a communication cable comprising a cable core provided in the center and surrounded by an outside cladding as well as provided with strain relief elements in the region of the outside cladding, the improvement comprising at least one optical transmission element with at least one light waveguide being additionally provided in the region of the strain relief elements, each optical transmission element being arranged in a projection that extends outwardly from the cable cladding and extends along the length of the cladding, each optical transmission element being arranged to extend parallel to a cable axis and proceeds on a straight line with reference to the cable axis.

2. In a communication cable according to claim 1, wherein two optical transmission elements are arranged preferably lying diametrically opposite one another.

3. In a communication cable according to claim 1, wherein each optical transmission element is arranged in its own protective sheath.

4. In a communication cable according to claim 1, wherein the projection with the optical transmission element is partably applied to the cable cladding.

5. In a communication cable according to claim 4, wherein the parted projection with the optical transmission element is employed as an independent optical cable after being separated from the cable cladding.

6. In an optical communication cable according to claim 1, wherein the optical transmission element comprises additional means for improving the tensile strength in the form of element selected from spun elements and woven elements.

7. In a communication cable according to claim 1, wherein the strain relief elements are arranged in a symmetrical configuration with respect to each of the optical transmission elements.

8. In a communication cable according to claim 1, wherein at least two optical transmission elements are provided, and an even number of strain elements are provided for each of optical transmission elements.

9. In a communication cable according to claim 1, wherein the strain relief elements are constructed as metallic conductors.

10. In a communication cable according to claim 1, wherein the outside cladding also co-encloses optical transmission elements.

11. In a communication cable according to claim 1, wherein each of the strain relief elements is provided with means to improve embedding the element in the cladding material, said means being selected from being profiled and an adhesion promoter.

12. In a communication cable according to claim 1, wherein at least one of the strain elements is constructed as a rip thread to provide means for the projection with parting the optical transmission element from the cable.

13. In a communication cable according to claim 1, wherein the cable core is constructed in a center as an electrical cable.

14. In a communication cable according to claim 13, wherein said electrical cable is a coaxial cable.

15. In a communication cable according to claim 1, wherein the cable core is constructed as an optical cable.

16. In a communication cable according to claim 1, wherein the cable core is a central hollow tube capable of having cable subsequently drawn therein.

17. In a communication cable comprising a cable core provided in the center and surrounded by an outside cladding as well as provided with strain relief elements in the region of the outside cladding, the improvement comprising at least one optical transmission element with at least one light waveguide being additionally provided in a projection which extends outwardly from the cable cladding in the region of the strain relief elements, said projection extending along the length of the cladding with the optical element extending parallel to an axis of the cable and proceeding on a straight line with reference to the cable axis, and the strain relief elements being arranged in a symmetrical configuration with respect to each of the optical transmission elements.

18. In a communication cable according to claim 17, which includes two optical transmission elements being arranged in two diametrically opposite projections.

19. In a communication cable according to claim 18, wherein each projection is partable from the cladding to provide an independent optical cable after being separated from the cable cladding.

20. In a communication cable according to claim 17, wherein an even number of strain elements are provided for each of the optical elements.

* * * * *